US012735593B2

(12) United States Patent
Matsumoto et al.

(10) Patent No.: US 12,735,593 B2
(45) Date of Patent: Sep. 15, 2026

(54) SOLVENT-BASED INKJET INKS

(71) Applicant: KAO CORPORATION, Tokyo (JP)

(72) Inventors: Yuta Matsumoto, Cincinnati, OH (US); Todd Tritcak, Cincinnati, OH (US)

(73) Assignee: KAO CORPORATION, Tokyo (JP)

(*) Notice: Subject to any disclaimer, the term of this patent is extended or adjusted under 35 U.S.C. 154(b) by 585 days.

(21) Appl. No.: 18/260,287

(22) PCT Filed: Apr. 22, 2021

(86) PCT No.: PCT/US2021/028650
§ 371 (c)(1),
(2) Date: Jul. 3, 2023

(87) PCT Pub. No.: WO2022/225524
PCT Pub. Date: Oct. 27, 2022

(65) Prior Publication Data

US 2024/0076513 A1 Mar. 7, 2024

(51) Int. Cl.

| | |
|---|---|
| ***C09D 163/00*** | (2006.01) |
| ***B41J 11/00*** | (2006.01) |
| ***B41M 5/50*** | (2006.01) |
| ***C09D 11/033*** | (2014.01) |
| ***C09D 11/108*** | (2014.01) |
| ***C09D 11/36*** | (2014.01) |

(52) U.S. Cl.
CPC ............. *C09D 11/36* (2013.01); *B41J 11/002* (2013.01); *B41M 5/50* (2013.01); *C09D 11/033* (2013.01); *C09D 11/108* (2013.01)

(58) Field of Classification Search
CPC ..... C09D 11/36; C09D 11/033; C09D 11/108; B41J 11/002; B41M 5/50
See application file for complete search history.

(56) References Cited

U.S. PATENT DOCUMENTS 4,638,328 A * 1/1987 Drake ........................ B41J 2/02 347/75
5,302,631 A 4/1994 Yamada et al.
6,329,317 B1 12/2001 Takayama et al.
(Continued)

FOREIGN PATENT DOCUMENTS

CN 1243274 A 2/2000
CN 104919014 A 9/2015
(Continued)

OTHER PUBLICATIONS

International Search Report and Written Opinion issued Jul. 16, 2021, in PCT/US2021/028650, filed on Apr. 22, 2021, 2 pages.
(Continued)

*Primary Examiner* — Doris L Lee
(74) *Attorney, Agent, or Firm* — Oblon, McClelland, Maier & Neustadt, L.L.P.

(57) ABSTRACT

An inkjet ink that includes (A1) a terpene resin, and (B) a solvent system containing (B1) a ketone solvent having a boiling point of less than 120° C. and (B2) dioxolane, the inkjet ink being characterized by extended decap times and long throw distance. A printed article including the inkjet ink in dried form, and a method of forming a printed image with a thermal inkjet printhead are also provided.

16 Claims, 2 Drawing Sheets

Alphanumeric sequence

Kao Collins Inc.
1201 Edison Drive,
Cincinnati, OH 45216

Good; clearly readable; clear image; well-defined

Kao Collins Inc.
1201 Edison Drive
Cincinnati, OH 45216

Acceptable; readable; mostly clear with some haziness; slight loss of definition Kao Collins Inc.
1201 Edison Drive,
Cincinnati, OH 45216

Not Good; not readable; lacks clarity; poorly defined edges

(56) References Cited

U.S. PATENT DOCUMENTS

| | | | | |
|---|---|---|---|---|
| 6,869,986 | B1 * | 3/2005 | Millot | C09D 11/36 523/160 |
| 2003/0055163 | A1 * | 3/2003 | Urata | C08L 51/06 525/66 |
| 2004/0180291 | A1 * | 9/2004 | Collins | B41C 1/1008 430/176 |
| 2013/0035428 | A1 * | 2/2013 | Carlini | C09D 11/38 524/95 |
| 2015/0140442 | A1 | 5/2015 | Cyman, Jr. et al. | |
| 2016/0272827 | A1 * | 9/2016 | Goustiaux | C09D 11/102 |
| 2017/0137650 | A1 | 5/2017 | Liu et al. | |
| 2018/0251650 | A1 | 9/2018 | Xue et al. | |
| 2018/0291217 | A1 | 10/2018 | Kagata | |
| 2020/0102467 | A1 | 4/2020 | Nakamura et al. | |
| 2023/0057536 | A1 | 2/2023 | Irie et al. | |

FOREIGN PATENT DOCUMENTS

| | | | |
|---|---|---|---|
| CN | 108431142 | A | 8/2018 |
| JP | 5-70724 | A | 3/1993 |
| JP | 2000- 1642 | A | 1/2000 |
| JP | 2005-187745 | A | 7/2005 |
| JP | 2014-172224 | A | 9/2014 |
| JP | 2018-177899 | A | 11/2018 |
| JP | 2020-55996 | A | 4/2020 |
| JP | 2021-113258 | A | 8/2021 |
| WO | WO 2010/042104 | A1 | 4/2010 |

OTHER PUBLICATIONS

Extended European Search Report issued Nov. 14, 2024 in European Patent Application No. 21938099.5, 5 pages.

* cited by examiner

Alphanumeric sequence

Kao Collins Inc.
1201 Edison Drive,
Cincinnati, OH 45216

Good; clearly readable; clear image; well-defined

Kao Collins inc
1201 Edison Drive
Cincinnati, OH 45216

Acceptable; readable; mostly clear with some haziness; slight loss of definition Not Good; not readable; lacks clarity; poorly defined edges Good;
no lines missing/unclear Acceptable:
1 or 2 lines missing/unclear Not Good:
more than 2 lines missing/unclear

SOLVENT-BASED INKJET INKS

BACKGROUND OF THE INVENTION

Field of the Invention

The present invention relates to solvent-based inkjet inks, specifically inkjet inks formulated with (A1) a terpene resin, and (B) a solvent system that includes (B1) a ketone solvent having a boiling point of less than 120° C. and (B2) dioxolane.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal inkjet (TIJ) printing is a desirable technology for printing, coding, and marking as it offers high print resolutions at lower costs than competing technologies in the field, such as continuous inkjet (CIJ) methods. In thermal inkjet printing processes, the print cartridges contain a series of tiny chambers, each containing a heater, which produce ink droplets from thermal vaporization of an ink solvent. In the jetting process, a resistor is heated rapidly to produce a vapor bubble (hence the phrase "bubble jet"), which subsequently ejects a droplet from the orifice. This process is extremely efficient and reproducible and modern TIJ printheads for industrial graphics applications are capable of generating uniform droplets of 4 pL, or smaller in volume at frequencies of 36 kHz or greater.

However, industrial marking and coding regularly requires the printing of essential information—such as personal information, labels, codes, dating (e.g., expirations dates), and traceability information (e.g., manufacturing lot)—onto substrates having a complex surface, for example, substrates which are radial, curved, serrated, corrugated, fluted, and/or lipped. These complex substrates can introduce a large gap between the printhead and the substrate surface, which presents a significant challenge for TIJ technology that can traditionally only be used at throw distances on the order of 1 to 2 mm. When an ink must travel a distance beyond its throw distance performance capabilities before reaching the substrate surface, the resulting printed image will be of poor image quality (e.g., lack clarity, ill-defined) as a result of inaccuracies and detects in drop placement. Poor image quality is unacceptable for many applications, but particularly so for marking and coding of essential information. For this reason, even despite the other advantages, TIJ technology has had only modest accept, marking/coding applications because of the inability to compete with the throw distances offered by CIJ technology, which is typically in the range 5 to 12 mm.

Additionally, thermal inkjet printing can be troubled by poor reliability after periods of inactivity. For example, some inkjet inks suffer from short decap times, in which solvent losses due to prolonged exposure to air within an uncapped printhead leads to clogging/plugging of printhead nozzles, and thus unreliable ink jetting and image quality erosion over time.

Solvent-based inkjet inks made using specific combinations of binder resins and volatile organic solvents selected from $C_1$-$C_4$ alcohols, $C_3$-$C_6$ ketones, $C_3$-$C_6$ esters, and $C_4$-$C_8$ ethers have been reported previously to possess acceptable decap times and high adhesion to non-porous plastics, see US2018/0251650 incorporated herein by reference in its entirety. However, such ink systems are printed only at a throw distance of 1 mm, and no improvements to throw distance are reported.

SUMMARY OF THE INVENTION

In view of the forgoing, there is a need for inkjet inks that have extended decap times and can be printed at long throw distances (e.g., 8-15 mm).

Accordingly, it is one object of the present invention to provide novel inkjet inks that meet these criteria.

It is another object of the present disclosure to provide novel printed articles which contain a dried form of the inkjet inks.

It is another object of the present disclosure to provide novel methods of forming a printed image on a substrate by applying the inkjet inks onto the substrate and drying.

These and other objects, which will become apparent during the following detailed description, have been achieved by the inventors' discovery that the combination of a terpene resin, a ketone solvent having a boiling point of less than 120° C., and dioxolane, provides inkjet inks characterized by extended decap times and long throw distances, e.g., 8-15 mm.

Thus, the present invention provides:

(1) An inkjet ink, comprising:

(A1) a terpene resin; and (B) a solvent system comprising (B1) a ketone solvent having a boiling point of less than 120° C. and (B2) dioxolane.

(2) The inkjet ink of (1), wherein the terpene resin is present in an amount of 0.1 to 10 wt. %, based on a total weight of the inkjet ink.

(3) The inkjet ink of (1) or (2), wherein the terpene resin (A1) is a homopolymer made from α-pinene.

(4) The inkjet ink of any one of (1) to (3), wherein the ketone solvent (B1) is present in an amount of 1 to 90 wt. %, based on a total weight of the inkjet ink.

(5) The inkjet ink of any one of (1) to (4), wherein the ketone solvent (B1) is methyl ethyl ketone.

(6) The inkjet ink of any one of (1) to (5), wherein dioxolane (B2) is present in an amount of 2 to 90 wt. %, based on a total weight of the inkjet ink.

(7) The inkjet ink of any one of (1) to (6), wherein a weight ratio of dioxolane (B2) to the ketone solvent (B1) ((B2):(B1)) is 0.05:1 to 30:1.

(8) The inkjet ink of any one of (1) to (7), wherein a weight ratio of dioxolane (B2) to the terpene resin (A1) ((B2):(A1)) is 5:1 to 100:1.

(9) The inkjet ink of any one of (1) to (8), wherein the solvent system (B) further comprises (B3) a glycol ether.

(10) The inkjet ink of (9), wherein the glycol ether (B3) is present in an amount of 0.1 to 20 wt. %, based on a total weight of the inkjet ink.

(11) The inkjet ink of any one of (1) to (10), wherein the solvent system (B) further comprises (B4) an alcohol solvent.

(12) The inkjet ink of (11), wherein the alcohol solvent (B4) is present in an amount of 0.1 to 20 wt. %, based on a total weight of the inkjet ink.

(13) The inkjet ink of any one of (1) to (12), further comprising (A2) a terpene phenol resin.

(14) The inkjet ink of (13), wherein the terpene phenol resin (A2) is present in an amount of 0.1 to 10 wt. %, based on a total weight of the inkjet ink.

(15) The inkjet ink of any one of (1) to (14), further comprising (C) a surfactant.

(16) The inkjet ink of (15), wherein the surfactant (C) is present in an amount of 0.001 to 4 wt. %, based on a total weight of the inkjet ink.

(17) The inkjet ink of (15) or (16), wherein the surfactant (C) is a polyether modified silicone.

(18) The inkjet ink of any one of (1) to (17), further comprising (D) a colorant.

(19) A printed article, comprising a substrate and a dried form of the inkjet ink of any one of to (18) disposed on the substrate.

(20) A method of forming a printed image on a substrate, comprising:

applying the inkjet ink of any one of (1) to (18) onto the substrate with a thermal inkjet printhead; and drying the inkjet ink.

BRIEF DESCRIPTION OF THE DRAWINGS

The foregoing paragraphs have been provided by way of general introduction, and are not intended to limit the scope of the following claims. The described embodiments, together with further advantages, will be best understood by reference to the following detailed description when considered in conjunction with the accompanying drawings, wherein:

DETAILED DESCRIPTION OF THE INVENTION

Figure 1:
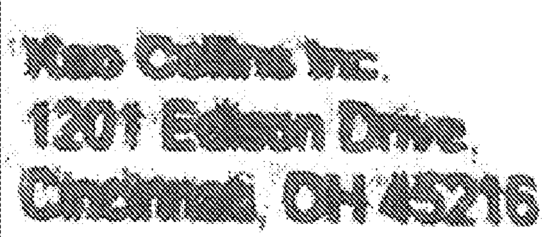
FIG. 1 illustrates the throw distance evaluation for a "Good" rating (clearly readable, clear and well-defined image), an "Acceptable" rating (readable, mostly clear with some haziness or slight loss of edge definition), and a "Not Good" rating (not readable, lacks clarity and is poorly defined) for an alphanumeric sequence.

In the following description, it is understood that other embodiments may be utilized and structural and operational changes may be made without departure from the scope of the present embodiments disclosed herein.

The phrase "substantially free"; unless otherwise specified, describes an amount of a particular component in the inkjet ink being less than 1 wt. %, preferably less than 0.5 wt. %, more preferably less than 0.1 wt. %; even more preferably less than 0.05 wt. %, yet even more preferably 0 wt. %, relative to a total weight of the inkjet ink.

As used herein; the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having at least 1, preferably at least 2, preferably at least 3, preferably at least 4 carbon atoms, and up to 22, preferably up to 20, preferably up to 18, preferably up to 12, preferably up to 8 carbon atoms. Examples of alkyl groups include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethythexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl). Cycloalkyl is a type of cyclized alkyl group. Exemplary cycloalkyl groups include, but are not limited to, cyclopropyl, cyclobutyl, cyclopentyl, cyclohexyl, norbornyl, and adamantyl.

As used herein, the term "fatty" describes a compound with a long-chain (linear) hydrophobic portion made up of hydrogen and anywhere from 8 to 22 carbon atoms, which may be fully saturated or partially unsaturated.

As used herein, the term "aryl" refers to an aromatic group containing only carbon in the aromatic ring(s), such as phenyl, biphenyl, naphthyl, anthracenyl, and the like.

The term "arylalkyl", as used herein, refers to a straight, branched, or cyclic alkyl moiety (as defined above) that is substituted by an aryl group (as defined above) which may itself be optionally substituted by an alkyl group, examples of which include, but are not limited to, benzyl, phenethyl, 3-phenylpropyl, 2-phenylpropyl, 1-phenylpropyl, 4-phenylbutyl, 3-phenylbutyl, 2-phenylbutyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "(meth)acrylate" is used herein to refer to both acrylate and methacrylate groups. In other words, this term should be read as though "meth" is optional. Further, the term "(meth)acrylate" is used generally to refer to both acrylic acid-based compounds and acrylic ester-based compounds.

Throughout the specification, the term "boiling point" (b.p.) refers to the boiling point of a liquid measured at sea-level atmospheric pressure (i.e., 760 mmHg or 1 atmosphere), also called the normal boiling point, unless specified otherwise.

The term "decap behavior" herein, means the ability of the inkjet ink to readily eject from the printhead, upon prolonged exposure to air. The inkjet ink "decap time" is measured as the amount of time that an inkjet printhead may be left uncapped before the printer nozzles no longer fire properly, potentially because of clogging or plugging when printing resumes. Generally, nozzle(s) may become clogged (i.e., impeded, slowed) or plugged (i.e., obstructed, substantially or completely closed) by a viscous plug that forms in the nozzle(s) as a result of solvent loss, crusting of the ink, and/or kogation of various ink components in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is a misdirection of ink through the nozzle's orifice to a lesser or greater degree, or a complete blockage, which can be measured by visually inspecting a printed image.

As used herein, the terra "throw distance" is defined as the distance between the printhead and the surface of the substrate that can be used whilst still achieving desirable printed image quality.

Inkjet Inks

The present disclosure directed to inkjet inks that possess suitable physical and chemical stability at both ambient temperatures and printhead operating temperatures, are jetted reliably, have prolonged decap times while still drying quickly after being applied onto a substrate, and enable thermal inkjet printing at long throw distances, e.g., up to 10 mm.

Inkjet inks of the present disclosure generally include the following components: (A1) a terpene resin, and (B) a solvent system comprising (B1) a ketone solvent having a boiling point of less than 120° C. and (B2) dioxolane.

The inkjet inks of the present disclosure may also optionally include one or more of (A2) a terpene phenol resin, (B3) a glycol ether and/or (B4) an alcohol solvent as part of the solvent system (B), (C) a surfactant, (D) a colorant, and (E) an additive.

(A) Resin(s)

Inkjet inks of the present disclosure are formulated with a terpene resin (A1). Typically, the terpene resin (A1) is employed in an amount of at least 0.1 wt. %, preferably at least 0.2 wt. %, preferably at least 0.4 wt. %, preferably at least 0.6 wt. %, more preferably at least 0.8 wt %, even more preferably at least 0.9 wt. %, yet even more preferably at least 1 wt. %, and up to 10 wt. %, preferably up to 9 wt. %, preferably up to 8 wt. %, preferably up to 7 wt. %, preferably up to 6 wt. %, preferably up to 5 wt. %, more preferably up to 4 wt. %, even more preferably up to 3 wt. %, yet even more preferably up to 2 wt. %, based on a total weight of the inkjet ink.

The terpene resin (A1) of the present disclosure refers to oligomers or polymers having at least 95 wt. %, preferably at least 96 wt. %, more preferably at least 97 wt. %, more preferably at least 98 wt. %, more preferably at least 99 wt. %, even more preferably at least 99.5 wt. %, yet even more preferably 100 wt. % of constitutional units derived from a polymerizable terpene(s), based on the total constitutional units (100 wt. %) of the terpene resin (A1). Terpenes have a basic skeleton $(C_5H_8)_p$ where p is a positive integer that delineates the number of isoprene units that are successively bound head to tail. For example, hemiterpenes (p=1) have a $C_5H_8$ skeleton, monoterpenes (p=2) have a $C_{10}H_{16}$ skeleton, sesquiterpenes (p=3) have a $C_{15}H_{24}$ skeleton, and so forth.

In some embodiments, the terpene resin (A1) is based on monoterpene monomer units. The monoterpene may be a linear monoterpene (e.g., myrcene, ocimene, etc.), a monocyclic monoterpenes (e.g., limonene, γ-terpinene, α-phellandrene, β-phellandrene, terpinolene, etc.), or a bicyclic monoterpene e.g., 3-carene, α-pinene, β-pinene, α-fenchene, camphene, etc.), including the various stereoisomers thereof, as well as mixtures thereof. In some embodiments, the monoterpene is a monocyclic monoterpene, with particular preference to limonene. In preferred embodiments, the monoterpene is a bicyclic monoterpene, with particular preference to 3-carene, α-pinene, β-pinene, and camphene, more preferably α-pinene and/or β-pinene, even more preferably α-pinene.

Preferred inkjet inks are those formulated with a terpene resins (A1) made from polymerization or oligamerization of pinene. As known by those of ordinary skill in the art, such terpene resins may be readily obtained for example through catalytic polymerization/oligomerization (in solution) of α-pinene monomers, which are in turn typically derived from fractional distillation of gum and sulfate turpentines obtained from pines such as *Pistacia terebinthus, Pinus pilaster, Pinus halepensis, Pinus massoniana, Pinus merkusii, Pinus palustris, Pinus taeda*, and *Pinus ponderosa*.

In preferred embodiments, the terpene resin (A1) is a homopolymer made from α-pinene, with an α-pinene content (constitutional units derived from α-pinene) of at least 95 wt. %, preferably at least 96 wt. %, preferably at least 97 wt. %, preferably at least 98 wt. %, preferably at least 99 wt. %, more preferably at least 99.5 wt. %, even more preferably at least 99.9 wt. %, yet even more preferably 100 wt. %, based on the total constitutional units (100 wt. %) of the terpene resin (A1). While the terpene resins (A1) of the present disclosure relay include small amounts of other constitutional units other than constitutional units derived from α-terpene monomers, the amount of other (e.g., non-terpene based) constitutional units is preferably less than 5 wt. %, preferably less than 3 wt. %, preferably less than 1 wt. %, more preferably less than 0.5 wt. %, even more preferably less than 0.1 wt. %, yet even more preferably 0 wt. %, based on the total constitutional units (100 wt. %) of the terpene resins (A1).

In some embodiments, the terpene resin (A1) is a homopolymer made from β-pinene, with a β-pinene content (constitutional units derived from β-pinene) of at least 95 wt. %, preferably at least 96 wt. %, preferably at least 97 wt. %, preferably at least 98 wt. %, preferably at least 99 wt. %, more preferably at least 99.5 wt. %, even more preferably at least 99.9 wt. %, yet even more preferably 100 wt. %, based on the total constitutional units (100 wt. %) of the terpene resin (A1). While the terpene resins (A1) of the present disclosure may include small amounts of other constitutional units other than constitutional units derived from β-terpene monomers, the amount of other (e.g., non-terpene based) constitutional units is preferably less than 5 wt. %, preferably less than 3 wt. %, preferably less than 1 wt. %, more preferably less than 0.5 wt. %, even more preferably less than 0.1 wt. %, yet even more preferably 0 wt. %, based on the total constitutional units (100 wt. %) of the terpene resins (A1).

Both polymeric and oligomeric forms of the terpene resin (A1) may be used herein, including combinations thereof. Typically, terpene resins (A1) are used herein that have a number average molecular weight ($M_n$) of at least 330 g/mol, preferably at least 340 g/mol, preferably at least 400 g/mol, preferably at least 450 g/mol, preferably at least 500 g/mol, preferably at least 550 g/mol, preferably at least 600 g/mol, more preferably at least 650 g/mol, even more preferably at least 700 g/mol, yet even more preferably at least 750 g/mol, and up to 1,500 g/mol, preferably up to 1,300 g/mol, preferably up to 1,100 g/mol, preferably up to 1,000 g/mol, more preferably up to 900 g/mol, even more preferably up to 800 g/mol, yet even more preferably up to 790 g/mol.

The terpene resins (A1) may be in the form of a solid or a liquid at room temperature. When in the form of a solid, the terpene resin (A1) utilized herein may be categorized based upon its softening point (SP), for example according to a ring-and-ball softening point method. The ring-and-ball softening point is defined as the temperature at which a disk of the sample held within a horizontal ring is forced downward a distance of 1 in. (25.4 mm) under the weight of a steel ball as the sample is heated at a prescribed rate in a glycerol bath. For example, the ring-and-ball softening point may be determined according to JIS B7410—which is incorporated herein by reference in its entirety—Measuring apparatus: Automatic Ring-and-Ball Softening Point; Tester: ASP-MGK2, manufactured by MEITECH Company Ltd.; Heating rate: 5° C./min; Temperature at which heating is started: 40° C.; Measurement solvent: glycerol. Terpene resins (A1) having a variety of softening points may be used herein, for example those with a softening point of at least 20° C., preferably at least 22° C., preferably at least 24° C., preferably at least 26° C., preferably at least 28° C., preferably at least 30° C., preferably at least 40° C., preferably at least 50° C., preferably at least 60° C., preferably at least 80° C., preferably at least 100° C., preferably at least 110° C., preferably at least 115° C., more preferably at least. 120° C., even more preferably at least 125° C., yet even more preferably at least 130° C. and up to 160° C., preferably up to 155° C. preferably up to 150° C., preferably up to 145° C., more preferably up to 140° C., even more preferably up to 138° C., yet even more preferably up to 135° C. In preferred embodiments, the terpene resin (A1) has a softening point of at least 20° C., preferably at least 22° C., more preferably at least 24° C., and up to 50° C., preferably up to 45° C., preferably up to 40° C., more preferably up to 35° C., even more preferably up to 30° C., yet even more preferably up to 28° C.

Bromine number is the amount of bromine ($Br_2$) in grams absorbed by 100 grams of a sample, and is an indicator of the degree of unsaturation of the sample. In some embodiments, the terpene resin (A1) employed in the inkjet inks has a bromine number of at least 12, preferably at least 15, preferably at least 19, preferably at least 22, more preferably at least 25, even more preferably at least 26, yet even more preferably at least 27, and up to 35, preferably up to 34, preferably up to 33, more preferably up to 32, even more preferably up to 31, yet even more preferably up to 30, although terpene resins (A1) having a bromine number above or below (e.g., hydrogenated terpene resins (A1)) these values may also find use in the disclosed inkjet inks.

The inkjet inks of the present disclosure may be formulated with a single type of terpene resin (A1), or with a combination of two or more types of terpene resins (A1). Examples of terpene resins (A1) that may be employed in the inkjet inks herein, either alone or in combination, include, but are not limited to, PICCOLYTE A115 (ring-and-ball SP=112-118° C., bromine number=31.5), PICCOLYTE A125 (ring-and-ball SP=122-128° C., bromine umber=31.5), PICCOLYTE A135 (ring-and-ball SP=132-138° C., bromine number=27), PICCOLYTE A135 PLUS (ring-and-ball SP=132-138° C.), PICCOLYTE AO PLUS (oligomer, liquid), PICCOLYTE A25 (ring-and-ball SP=22-28° C.), and PINOVA RESIN 2495 (ring-and-ball SP=132-138° C., bromine number=27), each being made from high purity α-pinene, available from Pinova, as well as PICCOLYTE S25 (made from high purity β-pinene, ring-and-ball SP=22-28° C. bromine number 19), available from Pinova. A particularly preferred terpene resin (A1) for use in the disclosed inkjet inks is PICCOLYTE A25.

The terpene resin (A1) has been found to provide superior decap times when used in combination with a ketone solvent (B1) having a boiling point of less than 120° C. and dioxolane (B2). Without being bound by theory, it is believed that the terpene resin (A1) improves the decap behavior of the inkjet inks by forming a thin 'skin' or film covering within the printhead nozzles, thereby creating a temporary seal that prevents or reduces solvent losses during periods of inactivity, but where the 'skin' can be easily broken once the printing operation resumes. The polarity of the terpene resin (A1) is believed to be high enough for vehicle solubility, but not so high as to inhibit 'skin' formation from taking place due to too strong an interaction with the solvent system.

In addition to the terpene resin (A1), the inkjet inks disclosed herein may optionally be formulated with a terpene phenol resin (A2). When employed, the terpene phenol resin (A2) may be used in amounts of at least 0.1 wt. %, preferably at least 0.2 wt. %, preferably at least 0.4 wt. %, preferably at least 0.6 wt. %, more preferably at least 0.8 wt. %, even more preferably at least 0.9 wt. %, yet even more preferably at least 1 wt. %, and up to 10 wt. %, preferably up to 9 wt. %, preferably up to 8 wt. %, preferably up to 7 wt. %, preferably up to 6 wt. %, preferably up to 5 wt. %, more preferably up to 4 wt. %, even more preferably up to 3 wt. %, yet even more preferably up to 2 wt. %, based on a total weight of the inkjet ink. Preferably, the amount (in terms of weight %) of terpene phenol resin (A2) is less than or equal to the amount of terpene resin (A1) in the inkjet ink. In some embodiments, the inkjet inks are substantially free of terpene phenol resin (A2).

Terpene phenol resins (A2) are the copolymeric reaction products from alkylation of one or more phenolic compounds with one or more terpenes. As known by those of ordinary skill in the art, such resins may be readily obtained through copolymerization of a phenolic compound and a terpene monomer under the catalytic action of strong acids, metal salts having a condensing effect, bleaching earths, Friedel-Craft catalysts or strong Lewis acids, (e.g., boron trifluoride), and the like.

While the terpene phenol resins (A2) of the present disclosure may include small amounts of other constitutional units other than the constitutional units derived from phenolic compounds and constitutional units derived from terpene, the amount of other (e.g., non-phenol and non-terpene based) constitutional units is preferably less than 5%, preferably less than 4 wt. %, preferably less than 3 wt. %, preferably less than 2 wt. %, more preferably less than 1 wt. %, even more preferably less than 0.5 wt. %, yet even more preferably 0 wt. %, based on the total constitutional units (100 wt. %) of the terpene phenol resin (A2).

The terpene phenol resin (A2) may be formed using any terpene having at least one olefinic double bond that is capable of being alkylated by a phenolic compound. In some embodiments, the terpene phenol resin (A2) is formed using monoterpene monomer units. The monoterpene may be a linear monoterpene (e.g., myrcene, ocimene, etc.), a monocyclic monoterpenes limonene, γ-terpinene, α-phellandrene, β-phellandrene, terpinolene, etc.), or a bicyclic monoterpene (e.g., 3-carene, α-pinene, β-pinene, α-fenchene, camphene, etc.), including the various stereoisomers thereof, as Lyell as mixtures thereof. In some embodiments, the monoterpene is a monocyclic monoterpene, with particular preference to limonene. In preferred embodiments, the monoterpene is a bicyclic monoterpene, with particular preference to 3-carene, α-pinene, β-pinene, and camphene, more preferably α-pinene and/or β-pinene.

A phenolic compound has at least one hydroxyl group directly bonded to a phenyl ring. All mono- or polyvalent phenolic compounds are useful in the preparation of the terpene phenol resin (A2) described herein provided that the phenolic compound has at least two replaceable hydrogen atoms in ortho- and/or para-positions with respect to at least one hydroxyl group. That is, the phenolic compound should be capable of being polyalkylated (e.g., bis-alkylated) with the terpene(s), and thus should have at least two available ortho-/para-positions with respect to at least one hydroxyl group for alkylation.

In preferred embodiments, the phenolic compound is phenol, which is considered the parent unsubstituted phenolic compound (i.e., contains one hydroxyl group bonded directly to the phenyl ring with no other substitution). Alternatively, the phenolic compound may be substituted at up to three positions in addition to the phenolic hydroxyl group, wherein one, two or three of the aromatic hydrogens of phenol are replaced with an equal number of substituents, each independently selected from a hydroxy group; a $C_1$-$C_{22}$ alkyl group, preferably a $C_2$-$C_{18}$ alkyl group, more preferably a $C_3$-$C_{12}$ alkyl group, even more preferably a $C_4$-$C_9$ alkyl group, for example, methyl, ethyl, n-propyl, isopropyl, n-butyl, isobutyl, tert-butyl; a $C_1$-$C_{22}$ alkoxy group, preferably a $C_2$-$C_{12}$ alkoxy group, more preferably a $C_3$-$C_6$ alkoxy group, for example, methoxy, ethoxy, and isopropoxy; an aryl group; an arylalkyl group, for example a benzyl group; and a halo group such as chlorine, bromine, fluorine and iodine.

Specific examples of substituted phenolic compounds include, but are not limited to, o-cresol, m-cresol, p-cresol, 2,5-xylenol, 2,3-xylenol, 3,4-xylenol, 3,5-xylenol, 2,3,5-trimethylphenol isopropylphenol (e.g., 4-isopropylphenol), tert-butylphenol (e.g., 4-tert-butylphenol), amylphenol (e.g., 4-tert-amylphenol), heptylphenol (e.g., 4-heptylphenol), octylphenol (e.g., o-octylphenol, p-octylphenol, etc.), nonylphenol (e.g., 4-(2,4-dimethylheptan-3-yl)phenol)), decylphenol, dodecylphenol, bisphenols such as diphenylolpropane (bisphenol-A), phenylphenol (e.g., 3-phenylphenol), cumylphenol, mequinol, benzyloxyphenol, guaiacol, ethoxyphenol (e.g., 4-ethoxyphenol), as well as polyhydric phenolic compounds such as resorcinol, pyrogallol, catechol, and p-hydroquinone, including mixtures of two or more of any of the above. Also included are fused ring phenols such as naphthols (e.g., 1-naphthol, 2-naphthol, etc.) and similar compounds. Preferred terpene phenol resins (A2) are those formed from copolymerization of phenol and one or more of α-pinene, β-pinene, and limonene.

The molecular weight of the terpene phenol resin (A2) may vary depending on the monomers utilized, the reaction conditions, among many other factors, but typically terpene phenol resins (A2) are used that have a weight average molecular weight (Mw) of at least 400 g/mol, preferably at least 500 g/mol, more preferably at least 600 g/mol, even more preferably at least 700 g/mol, and up to 3,000 g/mol, preferably up to 2,500 g/mol, more preferably up to 2,000 g/mol, even more preferably up to 1,500 g/mol, yet even more preferably up to 1,000 g/mol.

The terpene phenol resin (A2) may be categorized based upon its softening point (SP), for example according to the ring-and-ball softening point method as described heretofore (e.g., according to JIS B7410 incorporated herein by reference in its entirety). In some embodiments, the terpene phenol resin (A2) has a softening point of at least 60° C., preferably at least 80° C., preferably at least 90° C., preferably at least 100° C. preferably at least 105° C., more preferably at least 110° C., even more preferably at least 115° C., yet even more preferably at least 120° C., and up to 160° C., preferably up to 155° C., preferably up to 150° C., preferably up to 145° C., preferably up to 140° C., more preferably up to 135° C., even more preferably up to 130° C., yet even more preferably up to 125° C.

The hydroxyl value (OHV) is defined as the number of milligrams of potassium hydroxide required to neutralize the acetic acid taken up on acetylation of one gram of a chemical substance that contains free hydroxyl groups. Therefore, the hydroxyl value, or the measure of the relative hydroxyl content of the terpene phenol resin (A2), is directly correlated to the content of the phenolic compound(s) within the terpene phenol resin (A2), with higher hydroxyl values indicating higher phenolic compound incorporation into the copolymer (and lower terpene incorporation). Hydroxyl values can be determined according to Japanese Industrial Standards JIS K 0070: 1992 "Test methods for acid value, saponification value, ester value, iodine value, hydroxyl value, and unsaponifiable matter of chemical products."

The hydroxyl value of the terpene phenol resin (A2) employed in the disclosed inkjet inks may vary, for example, from 10 mgKOH/g to 150 mgKOH/g. However, in terms of decap behavior and compatibility with the solvent system (B), preferred terpene phenol resins (A2) are those having a hydroxyl value of at least 10 mgKOH/g, preferably at least 15 mgKOH/g, preferably at least 20 mgKOH/g, preferably at least 22 mgKOH/g, preferably at least 24 mgKOH/g, preferably at least 25 mgKOH/g, preferably at least 28 mgKOH/g, preferably at least 30 mgKOH/g, preferably at least 32 mgKOH/g, preferably at least 34 mgKOH/g, more preferably at least 36 mgKOH/g, even more preferably at least 38 mgKOH/g, yet even more preferably at least 40 mgKOH/g, and up to 80 mgKOH/g, preferably up to 75 mgKOH/g, preferably up to 70 mgKOH/g, preferably up to 65 mgKOH/g, preferably up to 60 mgKOH/g, more preferably up to 55 mgKOH/g, even more preferably up to 50 mgKOH/g, yet even more preferably up to 45 mgKOH/g, with hydroxyl values (OHV) of 20 to 60 mgKOH/g being the most preferred.

Examples of suitable terpene phenol resins (A2) that may be optionally employed in the inkjet inks herein, either alone or in combination, include, but are not limited to, YS POLYSTER products such as YS POLYSTER U130 (OHV=25 mgKOH/g; SP=130° C.), YS POLYSTER U115 (OHV=30 mgKOH/g; SP=115° C.), YS POLYSTER T160 (OHV=60 mgKOH/g; SP=160° C.), and YS POLYSTER T145 (OHV=65 mgKOH/g; SP=145° C.), available from Yasuhara Chemical Co. Ltd., and DERTOPHENE products such as DERTOPHENE T (OHV=20-50 mgKOH/g; SP=95° C.; Mw=700 g/mol), DERTOPHENE T105 (OHV=40 mgKOH/g; SP=105° C.; Mw=700 g/mol), DERTOPHENE T115 (OHV=50 mgKOH/g; SP=120° C.; Mw=700 g/mol), and DERTOPHENE T160 (OHV=60 mgKOH/g; SP=160° C.; Mw=about 1,000 g/mol), available from DRT/Pinova. A particularly preferred terpene phenol resin (A2) is DERTOPHENE T160.

In addition to the terpene resin (A1), and any optional terpene phenol resin (A2), the inkjet inks may optionally contain other binder resins/tackifiers/adhesive substances in an amount of at least 0.1 wt. %, preferably at least 0.5 wt. %, preferably at least 1 wt. %, more preferably at least 1.5 wt. %, even more preferably at least 2 wt. %, yet even more preferably at least 2.5 wt. %, and up to 10 wt. %, preferably up to 9 wt. %, preferably up to 8 wt. %, preferably up to 7 wt. %, preferably up to 6 wt. %, more preferably up to 5 wt. %, even more preferably up to 4 wt. %, yet even more preferably up to 3 wt. %, based on a total weight of the inkjet ink. Such additional resins, binders, tackifiers, or adhesive substances may include, but are not limited to,

- rosin resins, such as rosin resins derived from gum rosin, wood rosin, and tall oil rosin (the main components of which are resin acids such as abietic acid, palustric acid, neoabietic acid, pimaric acid, isopimaric acid and/or dehydroabietic acid), including rosin resins formed by modifying the aforementioned rosins through esterification, hydrogenation (including partial hydrogenation), dimerization, and/or other modifications/functionalization (e.g., through Diels-Alder reaction with an unsaturated di-acid like maleic or fumaric acid/anhydride, carboxylic acid reduction to the respective aldehydes/alcohols, double bond isomerization, dehydrogenation, oxidation, disproportionation, and the like). Exemplary rosin resins include, but are not limited to (1) a rosin ester resin, such as e.g., an ester of a rosin composed mainly of an abietic type or pimaric type resin acid that has been reacted with an alcohol(s) such as glycerin, pentaerythritol, ethylene glycol, diethylene glycol, triethylene glycol, methanol, etc., and optionally hydrogenated or partially hydrogenated, with specific mention being made to HARIESTER products available from Harima Chemicals, Inc., STAYBELITE ESTER 10-E and PERMALYN 6110, each available from Eastman, SUPER ESTER A-125, SUPER ESTER A-75, PENSEL D-125, PINECRYSTAL KE-359 available from Arakawa Chemical Industries. Ltd., and FORAL 85, FORAL 105, HERCOLYN products, PEXALYN products, and PENTALYN products available from Pinova; (2) a hydrogenated acidic rosin such as FORAL AX and FORAL DX, each available from Pinova; (3) a partially hydrogenated acidic rosin such as STAYBELITE RESIN-E, available from Eastman, and STAYBELITE and STAYBELITE A, each available from PINOVA; (4) a dimerized rosin such as POLY-PALE partially dimerized rosin available from Eastman; and (5) a functionalized rosin resin, for example an ester (e.g., glycerol ester) of a rosin which has been modified with maleic anhydride or a rosin which has been subject to carboxylic acid reduction conditions, with specific mention being made to LEWISOL 28-M and Abitol-E hydroabietyl alcohol, each available from Eastman;

phenol resins (i.e. copolymers of phenolic compounds with formaldehyde), for example novolak resins such as PHENOLITE TD-2131 and PHENOLITE TD-2090 available from DIC Corp.;

polyamide resins, for example VERSAMID 725, 744, 756, 759 available from BASF Japan Ltd., TOHMIDE 90, 92, 394-N available from Sanho Chemical Co. Ltd., and SUNMIDE 550, 554, 615A, 638, 640 available from Evonik;

epoxy resins including, sulfonamide-modified epoxy resins for example AD-PRO MTS available from Kit-Chem;

(meth)acrylate and styrene/(meth)acrylate resins for example JONCRYL 63, JONCRYL 67, JONCRYL 586, JONCRYL 611, JONCRYL 682, JONCRYL 693, available from BASF, PARALOID DM-55 and PARALOID B-66, available from Palmer Holland, PARALOID B-72, available from Dow Chemical, USA, and ELVACITE 2013, available from Lucite Inc.;

polyurethane resins, such as those formed from reaction between (i) polyols including, but not limited to, ethylene glycol, propylene glycol, propanediol, butanediol, polyethylene glycol, polypropylene glycol, polytetrahydrofuran diol, 3-methyl-1,5-pentonediol, 1,9-nonanediol, polyester polyols such as polyethylene glycol adipate diol, polyethylene glycol succinate diol, poly(3-methyl-1,5-pentanediol adipate) glycol, poly(3-methyl-1,5-pentanediol terephthalate) glycol, carbonate polyols, and (ii) diisocyanates including, but not limited to, 2,4-toluene diisocyanate, 2,6-toluene diisocyanate, 4,4-diphenylmethane diisocyanate, hexamethylene diisocyanate, and isophorone diisocyanate; for example PERMAX 200, PERMAX 202, and SANCURE 20025F, available from Lubrizol;

polyvinyl butyral resins, for example PIOLOFORM BN 16 and MOWITAL B20H available from Kuraray America, Inc.;

polyhydroxystyrene resins such as poly(p-hydroxy styrene) from DuPont;

vinyl resins, for example UCAR VYHH, VMCH, YMCA, and VAGF, available from Dow Chemical Company, and VINNOL E15/45, H14/36, E15/45M, and E16/40A, available from Wacker Chemie AG, Germany;

formaldehyde resins, including sulfonamide modified formaldehyde resins such as p-toluene sulfonamide formaldehyde resin, melamine formaldehyde resins, sulfonamide-modified melamine formaldehyde resins;

cellulose ester resins such as cellulose acetate butyrate (CAB-551-0.01) available from Eastman;

as well as polyesters, sulfonated polyesters, gums, cellulose ethers, cellulose nitrate resins, polymaleic anhydrides, acetal polymers, styrene/butadiene copolymers, ketone-aldehyde resins, and polyketone resins;

and the like, including mixtures thereof.

In some embodiments, other than the terpene resin (A1), and any optional terpene phenol resin (A2), the inkjet inks are substantially free of additional binder resins/tackifiers/adhesive substances, such as those mentioned above. In some embodiments, the inkjet inks contain a combination of the terpene resin (A1) and the terpene phenol resin (A2), and are preferably substantially free of additional resins, binders, tackifiers, or adhesive substances. In some embodiments, the terpene resin (A1) is the only resin present in the disclosed inkjet inks. In some embodiments, the inkjet inks are substantially free of rosin resins. In some embodiments, the inkjet inks are substantially free of rosin ester resins, partially hydrogenated acidic rosins, dimerized rosins, and other functionalized/modified rosin resins.

(B) Solvent System

In many printing processes that utilize solvent-based inks, and particularly in thermal inkjet printing, the selection of an appropriate solvent system may impact the reliability of the printing process, the properties/appearance of the printed ink product, and the overall printing process efficiency. For example in thermal inkjet printing, the choice of solvent system may 1) aid bubble formation during the jetting process resulting in reliable ink jetting, 2) affect the stability/volatility of the inkjet inks by changing the interaction dynamics between the solvent(s) and the various inkjet ink components and thus the decap behavior, kogation, and/or drop trajectory, 3) impact the adhesion, rub and scratch resistance, and optical density properties of the printed image through the interactive forces between the solvent system and the other inkjet ink components even though the solvent(s) may no longer be present, or may be present in lesser amounts, after drying, 4) influence the drying time after application or the equipment needed to dry the applied ink, and/or 5) impact droplet dynamics.

In light of the above, particular preference is given herein to inkjet inks with a solvent system (B) that includes one or more (B1) ketone solvent(s). The inclusion of the ketone solvent (B1) may aid solvation of the inkjet ink components, provide polarity compatibility with the terpene resin (A1) for desirable decap behavior, and provide the inkjet inks with acceptable volatility for the purposes of dry times.

The amount of ketone solvent (B1) used in the inkjet inks may vary widely, for example, from at least 1 wt. %, preferably at least 3 wt. %, preferably at least 5 wt. %, preferably at least 10 wt. %, preferably at least 15 wt. %, preferably at least 20 wt. %, preferably at least 25 wt. %, preferably at least 30 wt. %, preferably at least 35 wt. %, more preferably at least 40 wt. %, even more preferably at least 45 wt. %, yet even more preferably at least 50 wt. %, and up to 90 wt. %, preferably up to 85 wt. %, preferably up to 80 wt. %, preferably up to 75 wt. %, more preferably up to 70 wt. %, more preferably up to 65 wt. %, even more preferably up to 60 wt. %, yet even more preferably up to 55 wt. %, based on a total weight of the inkjet ink.

Preferred ketone solvents (B1) are those which have a boiling point of less than 120° C., preferably less than 115°

C., preferably less than 110° C., preferably less than 105° C., preferably less than 100° C., preferably less than 95° C., more preferably less than 90° C. even more preferably less than 85° C. yet even more preferably less than 80° C. When a ketone solvent (B1) is used which has a boiling point not greater than the above upper limit, fast drying times and advantageous decap times may be realized.

The ketone solvent (B1) may contain 3, 4, 5, or 6 carbon atoms. Examples of ketone solvents, which may be used singly or in combination in the disclosed inkjet inks, include, but are not limited to, acetone, methyl ethyl ketone (MEK), 3-pentanone, methyl n-propyl ketone, methyl isopropyl ketone, ethyl isopropyl ketone, and methyl isobutyl ketone, with methyl ethyl ketone being preferred.

The solvent system (B) of the disclosed inkjet inks is also formulated with (B2) dioxolane. Dioxolane (1,3-dioxolane) is a heterocyclic acetal with the chemical formula $(CH_2)_2O_2CH_2$. The inclusion of dioxolane (B2) has been surprisingly found to improve the throw distance of the inkjet inks enabling readable images to be produced at throw distances of e.g., 8-15 mm. On the other hand, inkjet inks described herein formulated without dioxolane fail to provide readable images beyond throw distances of 4 mm.

Without being bound by theory, it is believed that dioxolane influences the throw distance by changing the droplet dynamics of expelled inkjet ink droplets through a combination of density and surface tension factors. For example, dioxolane has a relatively high density (1.06 g/mL, at 25° C.) when compared to ketone solvents like methyl ethyl ketone (0.805 g/mL, at 25° C.), and it is believed that this higher density provides inkjet ink droplets with more accurate directionality and stability against air currents, turbulence, and/or eddies within the printing gap that may otherwise negatively impact drop placement. Also, dioxolane has a relatively high surface tension (34.3 mN/m at 25° C.) when compared to ketone solvents like methyl ethyl ketone (240 mN/m at 25° C.), and it is believed that the higher surface tension provides a more spherical and aerodynamic ink droplet that can travel farther distances whilst maintaining desired drop placement, in addition to droplet dynamics, dioxolane has also been found to be a unique solvent with respect to solubility/compatibility with the resin(s) (A) in the disclosed inkjet inks.

The amount of dioxolane (B2) suitable for attaining desirable throw distances may range from at least 2 wt. %, preferably at least 4 wt. %, preferably at least 5 wt. %, preferably at least 10 wt. %, preferably at least 15 wt. %, preferably at least 20 wt. %, preferably at least 25 wt. %, preferably at least 30 wt. %, preferably at least 35 wt. %, more preferably at least 40 wt. %, even more preferably at least 45 wt. %, yet even more preferably at least 50 wt. %, and up to 90 wt. %, preferably up to 85 wt. %, preferably up to 80 wt. %, preferably up to 75 wt. %, preferably up to 70 wt. %, more preferably up to 65 wt. %, even more preferably up to 60 wt. %, yet even more preferably up to 55 wt. %, based on a total weight of the inkjet ink.

In preferred embodiments, the ketone solvent (B1) and dioxolane (B2) together constitute a majority of the solvent system (B) used in the inkjet inks, i.e., the combined weight of the ketone solvent (B1) and dioxolane (B2) may range from at least 50 wt. %, preferably at least 60 wt. %, more preferably at least 70 wt. %, preferably at least 80 wt. %, preferably at least 90 wt. %, preferably at least 95 wt. %, preferably at least 96 wt. %, based on a total weight of the solvent system (B).

Relative to ketone solvent (B1), preferred inkjet inks are those having a weight ratio of dioxolane (B2) to the ketone solvent (B1) ((B2):(B1)) of from 0.05:1, preferably from 007:1, preferably from 0.1:1, preferably from 0.3:1, preferably from 0.5:1, more preferably from 0.7:1, even more preferably from 09:1, yet even more preferably from 1:1, and up to 30:1, preferably up to 25:1, preferably up to 20:1 preferably up to 15:1, preferably up to 10:1, more preferably up to 5:1, even more preferably up to 3:1, yet even more preferably up to 2:1.

Relative to terpene resin (A1), preferred inkjet inks are those having a weight ratio of dioxolane (B2) to the terpene resin (Al) ((B2):(A1)) ranging from at least 5:1, preferably at least 10:1, preferably at least 20:1, preferably at least 30:1, preferably at least 40:1, preferably at least 50:1, preferably at least 55:1, more preferably at least 60:1, even more preferably at least 65:1, yet even more preferably at least 70:1, and up to 100:1, preferably up to 95:1, preferably up to 90:1, more preferably up to 85:1, even more preferably up to 80:1, yet even more preferably up to 75:1.

The solvent system (B) may also optionally include a glycol ether (B3) to further improve decap performance without substantially worsening ink dry times. The glycol ether (B3) may be a monoalkyl ether, a dialkyl ether, a monoalkyl monoester ether, or a combination thereof, preferably the glycol ether (B3) is a monoalkyl monoester ether, i.e., a glycol compound where one hydroxyl group is etherified and the other hydroxyl group is esterified. The glycol ether (B3) may contain at least 3 carbon atoms, preferably at least 4 carbon atoms, more preferably at least 5 carbon atoms, even more preferably at least 6 carbon atoms, and up to 12 carbon atoms, preferably up to 10 carbon atoms, more preferably up to 8 carbon atoms.

In some embodiments, the solvent system (B) may be formulated with a mixture of glycol ethers (B3), for example, a first glycol ether and a second glycol ether in a weight ratio of at least 1:5, preferably at least 1:4, more preferably at least 1:3, even more preferably at least 1:2, yet even more preferably at least 1:1, and up to 5:1, preferably up to 4:1, more preferably up to 3:1, even more preferably up to 2:1.

Acceptable examples of glycol ethers (B3) that may be optionally included in the disclosed inkjet inks include, but are not limited to, ethylene glycol monomethyl ether, ethylene glycol monoethyl ether, ethylene glycol mono-isopropyl ether, ethylene glycol mono-n-propyl ether, ethylene glycol mono-t-butyl ether, ethylene glycol monobutyl ether, ethylene glycol mono-isobutyl ether, diethylene glycol monomethyl ether, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol monomethyl ether, ethylene glycol mono-n-butyl ether acetate, propylene glycol methyl ether acetate, diethylene glycol mono-n-butyl ether acetate, diethylene glycol monoethyl ether acetate, ethylene glycol dimethylether, diethylene glycol dimethylether, diethylene glycol methyl ethyl ether, diethylene glycol diethylether, dipropylene glycol dimethyl ether, dipropylene glycol mono-n-propyl ether, as well as mixtures thereof.

In terms of improving decap performance of the inkjet inks without considerably lengthening ink dry times, preferred glycol ethers (B3) are those which have a boiling point of less than 214° C., preferably less than 210° C., more preferably less than 205° C., even more preferably less than 200° C., yet even more preferably less than 195° C.

In light of the above, preference is given to ethylene glycol mono-n-butyl ether acetate, ethylene glycol monomethyl ether, propylene glycol monomethyl ether, ethylene glycol mono-n-propyl ether, and propylene glycol mono-n-propyl ether, with specific mention being made to ethylene glycol mono-n-butyl ether acetate.

When employed, the glycol ether (B3) may be present in the inkjet inks in an amount of at least 0.1 wt. %, preferably at least 0.3 wt. %, preferably at least 0.5 wt. %, preferably at least 0.7 wt. %, more preferably at least 1 wt. %, even more preferably at least 1.5 wt. %, yet even more preferably at least 2 wt. %, and up to 20 wt. %, preferably up to 15 wt. %, more preferably up to 10 wt. %, even more preferably up to 5 wt. %, yet even more preferably up to 3 wt. %, based on a total weight of the inkjet ink. The weight ratio of the ketone solvent (B1) to the glycol ether (B3) can be adjusted for desired drying times and decap times, but is typically within a range of at least 1:1, preferably at least 2:1, more preferably at least 5:1, even more preferably at least 10:1, yet even more preferably at least 15:1, and up to 50:1, preferably up to 40:1, more preferably up to 30:1, even more preferably up to 25:1, yet even more preferably up to 20:1.

The solvent system (B) may also optionally include (B4) an alcohol solvent. The inclusion of the alcohol solvent (B4) may be beneficial to aid solvation of the inkjet ink components, particularly when a terpene phenol resin (A2) is employed, and to aid jettability, among other benefits.

The alcohol solvent (B4) nay contain at least 1 carbon atom, preferably at least 2 carbon atoms, more preferably at least 3 carbon atoms, and up to 8 carbon atoms, preferably up to 6 carbon atoms, more preferably up to 4 carbon atoms. Preferred alcohol solvents (B4) are those which have a boiling point of less than 120° C., preferably less than 115° C., preferably less than 110° C., more preferably less than 105° C., even more preferably less than 100° C., yet even more preferably less than 98° C.

Suitable examples of alcohol solvents which may be used singly in combination the disclosed inkjet inks include, but are not limited to, methanol, ethanol, 1-propanol, 2-propanol, 1-butanol, 2-butanol, 2-pentanol, 3-pentanol, and t-amyl alcohol, with specific mention being made to 1-propanol.

When employed, the alcohol solvent (B4) may be present in the inkjet inks in an amount of at least 0.1 wt. %, preferably at least 0.3 wt. %, preferably at least 0.5 wt. %, more preferably at least 0.7 wt. %, even more preferably at least 0.9 wt. %, yet even more preferably at least 1 wt. %, and up to 20 wt. %, preferably up to 15 wt. %, more preferably up to 10 wt. %, more preferably up to 5 wt. %, even more preferably up to 3 wt. %, yet even more preferably up to 2 wt. %, based on a total weight of the inkjet ink. While the amount of alcohol solvent (B4) can be adjusted, for example to provide the desired levels of solvation, preferred inkjet inks are those having a weight ratio of terpene resin (A1) to alcohol solvent (B4) ((A1):(B4)) ranging from at least 1:5, preferably at least 1:4, more preferably at least 1:3, even more preferably at least 1:2, yet even more preferably at least 1:1, and up to 5:1, preferably up to 4:1, more preferably up to 3:1, even more preferably up to 2:1.

Other organic solvents may be optionally utilized as part of the solvent system (B) herein, examples of which include, but are not limited to, ethers (non-glycol ethers), including ethers containing 4 to 8 carbon atoms (e.g., diethyl ether, dipropyl ether, methyl tert-butyl ether, dibutyl ether, dioxane, and tetrahydrofuran); esters, including those having 3 to 8 carbon atoms, (e.g., methyl acetate, ethyl acetate, n-butyl acetate, methyl lactate, ethyl lactate); alkanes (e.g., pentane, hexane, and heptane); and the like; as well as mixtures of two or more thereof. When present, the other organic solvents may be included in amounts of up to 20 wt. %, preferably up to 15 wt. %, preferably up to 10 wt. %, preferably up to 5 wt. %, more preferably up to 4 wt. %, even more preferably up to 2 wt. %, yet even more preferably up to 1 wt. %, based on a total weight of the inkjet inks.

In preferred embodiments, the inkjet inks are substantially free of solvents having a boiling point higher than 220° C., preferably solvents having a boiling point higher than 210° C., more preferably solvents having a boiling point higher than 200° C., even more preferably solvents having a boiling point higher than 195° C. In some embodiments, the inkjet inks are substantially free of ketone solvents having a boiling point of 120° C. or greater, examples of which include but are not limited to, 3-hexanone, methyl n-butyl ketone, and cyclohexanone. In some embodiments, the inkjet inks are substantially free of glycol ethers (B3). In some embodiments, the inkjet inks are substantially free of alcohol solvents (B4). In preferred embodiments, the solvent system (B) consists of a ketone solvent (B1), dioxolane (B2), a glycol ether (B3), and an alcohol solvent (B4).

In preferred embodiments, the inkjet inks of the present disclosure are substantially non-aqueous, meaning that no water is added to the inkjet inks other than what may be incidental amounts of moisture derived from ambient conditions. In such cases, the inkjet inks may have less than 1 wt. %, preferably less than 0.5 wt. %, preferably less than 0.1 wt. %, more preferably less than 0.05 wt. %, even more preferably less than 0.01 wt. % of water, yet even more preferably 0 wt. %, based on the total weight of inkjet inks.

Surfactant (C)

The inkjet inks of the present disclosure may optionally include (C) a surfactant, for example, to provide anti-blocking, ink acceptance, levelling, anti-cratering, increased surface slip, d/or substrate wetting properties, among other benefits, without sacrificing inkjet ink decap and throw distance performance. When employed, the amount of surfactant (C) used may range from at least 0.001 wt. %, preferably at least 0.005 wt. %, preferably at least 0.01 wt. %, preferably at least 0.015 wt. %, preferably at least 0.02 wt. %, preferably at least 0.04 wt. %, more preferably at least 0.06 wt. %, even more preferably at least 0.08 wt. %, yet even more preferably at least 0.1 wt. %, and up to 4 wt. %, preferably up to 3 wt. %, preferably up to 2 wt. %, preferably up to 1 wt. %, preferably up to 0.8 wt. %, preferably up to 0.6 wt. %, more preferably up to 0.4 wt. %, even more preferably up to 0.3 wt. %, yet even more preferably up to 0.2 wt. %, based on a total weight of the inkjet ink.

Examples of surfactants (C) which may be used herein, singly or in combination, include, but are not limited to,

- polysiloxanes including organomodified silicones (e.g., alkyl, aryl, and/or arylalkyl modified silicones) such as SILTECH C-32, available from Siltech Corporation, COATOSIL 1211C and 3573 each available from Momentive, KF-410 (an arylalkyl-modified polydimethylsiloxane), available from Shin-Etsu Chemical Co., and BYK-322 and BYK-323 (arylalkyl-modified poly (dimethyisiloxane-co-methylalkylsiloxane)), each available from BYK Additives & Instruments;
- silicone acrylate copolymers such as KP-541, KP-543, KP-545, KP-550, and KP-575 (acrylic polymers; drafted with polydimethylsiloxane side chains, available from Shin-Etsu Chemical Co., Ltd.), and BYK-3550 (available from BYK Japan K.K.);
- polyether modified silicones, including those which are block copolymers having a pendent graft structure formed from a linear or branched polydimethylsiloxane backbone containing one or more polyether side chains and optionally one or more fatty alkyl side chains;

fluoropolymers such as FC-4430 and FC-4432, available from 3M Corporation;

photo-cross-linkable silicone acrylates or silicone polyether acrylates such as TEGO RAD 2100, TEGO RAD 2200, TEGO RAD 2250, TEGO RAD 2300 (silicone polyether acrylates), each available from Evonik Industries, and BYK-UV 3500 and 3530, available from BYK;

polyacrylates including polyacrylate copolymers and cross-polymers such as BYK-381 and BYK-361N (polyacrylate copolymer), available from BYK, PEMULEN EZ-4U (acrylate/C10-C30 alkyl acrylate crosspolymer) and PEMULEN TR-2 (acrylic acid/C10-C30 alkyl acrylate crosspolymer), each available from Lubrizol;

acetylenic diol and acetylenic glycol-based gemini surfactants such as SURFYNOL SEF and DYNOL surfactants, available from Evonik Industries;

polysiloxane-based gemini surfactants such as TEGO TWIN 4100, available from Evonik Industries;

non-ionic polyethers for example as substrate wetting surfactants such as TEGO WET 510 (hydrophilic polyether substrate wetting surfactant), available from Evonik Industries;

amides or monoalkanolamides of fatty acids, including alkoxylated monoalkanolamides of fatty acids such as coconut fatty acid monoethanolamide and coconut fatty acid monoethanolamide reacted with 2-20 moles of ethylene oxide;

ethers, such as alkoxylated $C_1$-$C_{22}$ alcohols including alkoxylated fatty alcohols such as BIO-SOFT N-600 (C12-C13 alcohol ethoxylate), MAKON DA-4 (ethoxylated isodecyl alcohol), MERPOL SE (alcohol ethoxylate), and POLYSTEP TD-6 (ethoxylated tridecyl alcohol), each available from Stepan, ethylene oxide/propylene oxide copolymers, alkoxylated alkylphenols, and alkyl polyglycosides (APGs) such as those made from reaction between fatty alcohols and glucose;

fatty esters such as ethoxylated and/or propoxylated fatly acids (e.g., castor oil with 2 to 40 moles of ethylene oxide), alkoxylated glycerides (e.g., PEG-24 glyceryl is monostearate), glycol esters and derivatives, monoglycerides, polyglyceryl esters, esters of polyalcohols, and sorbitan/sorbitol esters like sorbitan monolaurate (e.g., EMASOL L-10V, available from Kao) and polysorbates including mono-, bi- or tri-fatty acid esterified polysorbates such as TOXIMUL SEE-340 (sorbitan trioleate ethoxylate (20)), available from Stepan; and glycosides of fatty alcohols such as PLANTASENS NATURAL EMULSIFIER HE20 (cetearyl glucoside, sorbitan olivate), available from Clariant.

When the inkjet inks are formulated with a surfactant (C), a particularly preferred surfactant is a polyether modified silicone. The polyether modified silicone may be a block copolymer having a pendent graft structure, which comprises or consists of (i) a silicone backbone (main chain) and (ii) one or more polyether side chains attached to the silicone backbone, and optionally (iii) one or more fatty alkyl side chains attached to the silicone backbone. Therefore, as long as at least one polyether side chain is attached to a silicone backbone, the material meets the definition of a "polyether modified silicone" regardless of whether additional side chain types (e.g., fatty alkyl side chains) are also attached to the silicone backbone. Preferably, no other side chains, besides the polyether side chain(s) and optionally the fatty alkyl side chain(s) are present in the polyether modified silicone. As referred to herein, "side chains" are not continuations of the silicone backbone—as would be the case in linear block copolymers, for example of A-B-A structure—but instead are attached to the silicone backbone (main chain) as pendent grafts thereby forming a branching point on the silicone backbone with the side chains extending from the silicone backbone via covalent bonds. Preferred polyether modified silicones are those which are non-hydrolyzable, that is, where the side chains are attached to the silicone backbone via Si—C bonds.

<(i) silicone backbone> The silicone backbone may be based on any organosilicon polymer or oligomer (polyorganosiloxane) of linear or branched structure, of variable molecular weight, which can be formed from polymerization and/or polycondensation of suitably functionalized silanes, and which has a polysiloxane backbone structure (silicon atoms are linked together via oxygen atoms. —Si—O—Si—), with alkyl, aryl, and/or arylalkyl groups directly bonded to the (tetravalent) silicon atoms. For example, the polyorganosiloxane backbone may be a linear structure including, but not limited to, a polydimethylsiloxane (dimethicone) backbone (where each silicon atom in the backbone is directly bonded to two methyl groups), a poly(dimethylsiloxane-co-methylphenylsiloxane) backbone, a poly(dimethylsiloxane-co-diphenylsiloxane) backbone, and a poly (dimethylsiloxane-co-methylalkylsiloxane) backbone; or a branched structure with specific mention being made to a polydimethylsiloxyethyl dimethicone.

<(ii) polyether side chain> The polyether modified silicone contains at least one polyether side chain, which is based on a polyalkylene glycol oligomer or polymer, for example those formed from ring opening polymerization of one or more alkylene oxides, with ethylene oxide (EO), propylene oxide (PO), and/or butylene oxide (BO) being the most preferred, including copolymers such as block copolymers thereof. Preferably, the polyether side chain is a polyethylene glycol or a polyethylene glycol-polypropylene glycol copolymer which extends from the silicone backbone, more preferably the polyether side chain is a polyethylene glycol side chain (formed from only ethylene oxide, EO).

Various lengths of polyether side chain(s) may be utilized typically, the number of moles of alkylene oxide units per side chain ranges from at least 2, preferably at least 3, more preferably at least 4, even more preferably at least 5, yet even more preferably at least 6, and up to 50, preferably up to 40, preferably up to 30, preferably up to 20, preferably up to 15, more preferably up to 12, even more preferably up to 10, yet even more preferably up to 9, with particular preference given to 3 to 10 moles, preferably 4 to 9 moles of ethylene oxide (EO) units per side chain.

Moreover, any polyether side chain present may be uncapped (whereby the end of the polyether side chain opposite of the silicone backbone terminates in —H, forming a terminal hydroxyl functional group) or may be capped with an alkyl group having 1, 2, 3, or 4 carbon atoms (forming a terminal alkyl ether group), with specific mention being made to methyl, ethyl, propyl, and butyl.

<(iii) fatty alkyl side chain> The polyether modified silicone may optionally also be modified with one or more fatty alkyl side chains, such as those containing at least 8 carbon atoms, preferably at least 10 carbon atoms, more preferably at least 12 carbon atoms, and up to 22 carbon atoms, preferably up to 20 carbon atoms, more preferably up to 18 carbon atoms, even more preferably up to 16 carbon atoms, yet even more preferably up to 14 carbon atoms. Exemplary fatty alkyl side chain groups include, but are not limited to, capryl, nonyl, decyl, undecyl, tridecyl, myristyl, pentadecyl, cetyl, palmitoleyl, heptadecyl, stearyl, oleyl, arachidyl, and behenyl, with specific mention being made to lauryl, myristyl, cetyl, and stearyl, preferably lauryl.

In some embodiments, the polyether modified silicone is a block copolymer having a pendent graft structure formed from a linear polydimethylsiloxane backbone containing one or more polyether side chains, for example as represented by formula (I-A)

(I-A)

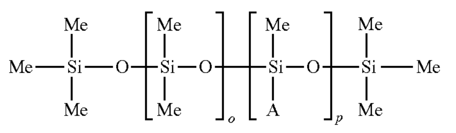

where:

o is 0 or a positive integer, for example at least 1, preferably at least 2, more preferably at least 3, even more preferably at least 4, yet even more preferably at least 5, and up to 500, preferably up to 400, preferably up to 300, more preferably up to 200, even more preferably up to 100, yet even more preferably up to 50;

p represents the number of constitutional units containing the polyether side chain, and is a positive integer, for example at least 1, preferably at least 2, more preferably at least 3, even more preferably at least 4, yet even more preferably at least 5, and up to 100, preferably up to 80, preferably up to 60, more preferably up to 40, even more preferably up to 20, yet even more preferably up to 10; and A is a polyether containing group represented by formula (II)

(II)

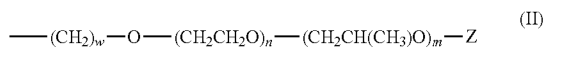

where w is at least 2, preferably at least 3, and up to 6, preferably up to 5, more preferably up to 4, even more preferably w is 3;

n is 0 or an integer of at least 1, preferably at least 2, more preferably at least 3, even more preferably at least 4, and up to 30, preferably up to 20, more preferably up to 10, even more preferably up to 9, yet even more preferably n is 3 to 10;

m is 0 or an integer of up to 30, preferably up to 10, preferably up to 9, preferably up to 5, more preferably up to 2, even more preferably up to 1, yet even more preferably in is 0; and Z is H or an alkyl group having 1 to 4 carbon atoms, preferably H (uncapped).

In some embodiments, the polyether modified silicone is a block copolymer having a pendent graft structure formed from a branched polydimethylsiloxane backbone containing one or more polyether side chains and one or more fatty alkyl side chains, for example as represented by formula (I-B)

(I-B)

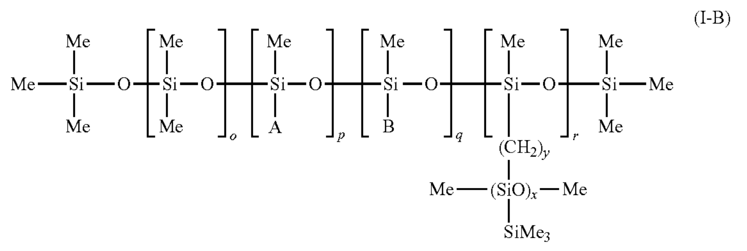

where:

o, p, and A are as described above;

B is a fatty alkyl group, preferably a fatty alkyl group having at least 10 carbon atoms, preferably at least 12 carbon atoms, and up to 18 carbon atoms, preferably at least 16 carbon atoms, preferably at least 14 carbon atoms, with specific mention being made to lauryl, myrislyl, cetyl, and stearyl;

q represents the number of constitutional units containing the fatty alkyl side chain, and is a positive integer, for example at least 1, preferably at least 2, more preferably at least 3, even more preferably at least 4, yet even more preferably at least 5, and up to 50, preferably up to 40, preferably up to 30, more preferably up to 20, even more preferably up to 10, yet even more preferably up to 5;

r represents branching in the polydimethylsiloxane backbone, and is a positive integer, for example a positive integer of up to 50, preferably up to 40, preferably up to 30, preferably up to 20, preferably up to 10, preferably up to 5, more preferably up to 3, even more preferably up to 2, yet even more preferably 1;

x is a positive integer, for example at least 1, preferably at least 2, more preferably at least 3, even more preferably at least 4, yet even more preferably at least 5, and up to 200, preferably up to 150, preferably up to 100, more preferably up to 75, even more preferably up to 50, more preferably up to 30, even more preferably up to 20, yet even more preferably up to 10; and y is at least 2 and up to 6, preferably 2.

Suitable examples of the polyether modified silicone which may be employed in the disclosed inkjet inks include, hut are not limited to, KF-6013 (PEG-9 dimethicone, uncapped, HLB=10.0), KF-6015 (PEG-3 dimethicone, uncapped, FMB=4.5), KF-6017 (PEG-10 dimethicone, uncapped, HLB=4.5), and KF-6038 (Lauryl PEG-9 polydimethylsiloxyethyl dimethicone, uncapped, HLB=3.0), each available from Shin-Etsu Chemical Co., and BYK-307 (polyether modified polydimethylsiloxane), available from BYK Additives & Instruments.

In some embodiments, the inkjet inks of the present disclosure are substantially free of surfactants (C), such as those listed above.

(D) Colorant

It is to be readily appreciated by those of ordinary skill in the art that one or more colorants (D) may be optionally included in the inkjet inks to provide colored inks that may be used for a variety of printing purposes and the inkjet inks are not limited to any particular color. Any colorant (D) can be employed in the inkjet inks to provide the desired color, including dyes, pigments, mixtures thereof, and the like, provided that the colorant (D) can be dissolved or dispersed within the inkjet inks. Suitable colors include, for example, cyan, magenta, yellow, and key (black) ("CMYK"), white, orange, green, light cyan, light magenta, violet, and the like, including both spot colors and process colors. In general, the colorants (D) may be employed in amounts of at least 0.1 wt. %, preferably at least 0.5 wt. %, preferably at least 1 wt. %, preferably at least 2 wt. %, preferably at least 3 wt. %, more preferably at least 5 wt. %, even more preferably at least 7 wt. %, yet even more preferably at least 10 wt. %, and up to 20 wt. %, preferably up to 18 wt. %, more preferably up to 16 wt. %, even more preferably up to 14 wt. %, yet even more preferably up to 12 wt. %, based on a total weight of the inkjet inks.

The inkjet inks can be formulated with various dyes, with particular preference given to organic dyes such as OIL BLACK 860, available from Orient Chemical Industries, and metal complex dyes.

The inkjet inks can be formulated with various inorganic pigments and/or organic pigments. In addition to providing color to the inkjet inks, such pigments may be capable of improving the light resistance, the weather resistance, etc., of the printed images.

(E) Additive(s)

In addition to the components already mentioned, the inkjet inks may also optionally be formulated with various additives (E) to improve various ink characteristics and performance. For example, the inkjet inks may optionally contain one or more of an anti-kogation agent, a stabilizer, a humectant, a security taggant, or other inkjet ink additive(s) known by those of ordinary skill in the art, in art appropriate levels.

Methods of Making

Embodiments of the inkjet inks described herein may be prepared by any suitable technique known to those of ordinary skill in the art, for example by combining (A1) a terpene resin and any desired optional ingredients (e.g., (A2) terpene phenol resin, (C) surfactant, (D) a colorant, and/or an additive (E)) with a suitable solvent system (B) comprising (B1) a ketone solvent and (B2) dioxolane and optionally (B3) a glycol ether and/or (B4) an alcohol solvent, in any order and stirring, agitating, and/or homogenizing at a temperature between 20 and 100° C. for a suitable amount of time to form a homogeneous solution.

In one example, the inkjet ink may be made by first combining the terpene resin (A1) with the ketone solvent (B1) and dioxolane (B2), and any optional resins (e.g., terpene phenol resin (A2)), optional alcohol solvents (B4), optional surfactants (C), or other optional additive(s) (E) in a vessel, followed by stirring for at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes. Glycol ether (B3), when employed, may then be added to the resulting mixture, and subsequently stirred for at least 10 minutes, preferably at least 15 minutes, preferably at least 20 minutes, preferably at least 25 minutes. The colorant (D) may then be added as the final component with continued mixing, and the solution may then be mixed for at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes to afford the inkjet ink. The resulting inkjet ink may then be placed into a printing cartridge, such as e.g., a FUNAI TIJ cartridge made by Funai Co., or other printhead suitable for ketone-based ink.

Properties

The inkjet inks disclosed herein possess extended decap times, for example as measured by printing a narrow line picture (e.g., barcode) (1 m*1 cm, narrow lines, Monochrome bitmap), exposing the inkjet ink to air (decapping the ink cartridge) for a particular time (e.g., 30 seconds, 1 minute, 10 minutes, 60 minutes, etc.), reprinting the same narrow line image, and comparing the reprinted image after decapping to the original image to determine if loss of lines/loss of line clarity occurs in the narrow line image. If no loss of lines/loss of line clarity occurs at the tested time interval, then the inkjet inks are given a "Good" decap rating for that time interval. If 1-2 lines are lost/lost clarity at the tested time interval, but not enough to significantly affect the clarity or readability of the narrow line image, then the inkjet inks are given an "Acceptable" decap rating for that time interval. If more than 2 lines are lost/lost clarity at the tested time interval, then the inkjet ink is classified as "Not Good" at that time interval. Suitable inkjet inks are those which achieve an "Acceptable" or "Good" decap classification when decapped (i.e., exposed to air) for 30 seconds or longer, preferably 1 minute or longer, more preferably 10 minutes or longer, even more preferably 30 minutes or longer, yet even more preferably 60 minutes or longer.

The inkjet inks disclosed herein are also characterized by long throw distance. The throw distance of an inkjet ink may be measured by printing a test pattern with increasing distances between the printhead and the substrate and assessing the quality of the image at each distance. This may include printing an image such as an alphanumeric sequence at various throw distances (e.g., 2 mm, 4 mm, 6 mm, 8 mm, and 10 mm) and visually assessing the quality of printed image in terms of image clarity, edge definition, and accuracy of drop placement. If the printed image is clearly readable, with well-defined edges and accurate drop placement, then the inkjet inks are given a "Good" throw distance rating for that tested throw distance. If the printed image is readable, but has some haziness, slight loss of edge definition, and/or slight loss of drop placement accuracy, then the inkjet inks are given an "Acceptable" throw distance rating for that tested throw distance. If the printed image is not readable, because the images lack clarity, have poor edge definition and/or inaccurate drop placement, then the inkjet inks are given a "Not Good" throw distance rating for that tested throw distance. Preferred inkjet inks are those which maintain a "Good" or "Acceptable" throw distance evaluation for throw distances of at least 1 mm, preferably at least 2 mm, preferably at least 3 mm, preferably at least 4 mm, preferably at least 5 mm, preferably at least 6 mm, preferably at least 7 mm, more preferably at least 8 mm, even more preferably at least 9 mm, yet even more preferably at least 10 mm, and up to 15 mm, preferably up to 14 mm, preferably up to 13 mm, preferably up to 12 mm.

Another advantage of the disclosed inkjet inks is that they can be readily tuned and adjusted for optical density to meet consumer needs, needs for a particular application, etc. Optical density of the inks may be measured by printing a solid block image (e.g., 1 cm*10 cm) and taking optical density readings with a spectrophotometer (e.g., X-rite eXact, Density/TVI mode, sold by X-rite). As optical density is the measure of reflected or absorbed light being pulled into the printed surface, optical density values are dimensionless. Inkjet inks that produce images with optical density readouts of under 1.90 are considered to provide low optical density images, whereas those inkjet inks that provide optical density readouts of 1.90 or higher are deemed to provide high optical density images. Typical inkjet inks of the present disclosure provide images with an optical density of at least 1.90, preferably at least 2.00, preferably at least 2.10, preferably at least 2.20, preferably at least 2.30, preferably at least 2.40, preferably at least 2.50, and up to 2.70, or preferably up to 2.60, though optical density values above or below these ranges can also be produced, as desired.

Printed Article

The inkjet inks can be printed on various substrates including three dimensional parts as well as flat sheets or webs that are supplied in roll form, for the manufacture of a wide variety of printed articles. While flat substrates are suitable substrates for forming printed articles, a particular advantage of the present disclosure is that the disclosed inkjet inks having long throw distance capabilities enable printed images to be formed on complex three dimensional substrates, such as those which are radial, curved, serrated, corrugated, fluted, lipped, and/or those which have a structured surface (e.g., grained surface), all of which are notoriously difficult substrates owing to the long distance that the ink must travel to reach all parts of the complex surface. The printed articles may be suitable in the graphic arts, textiles, packaging (e.g., food packaging, pharmaceutical packaging, etc.), lottery, direct mail, business forms and publishing industries, examples of which include a tag or label, a lottery ticket, a publication, packaging (e.g., food packaging, pharmaceutical packaging, blister packaging, other various flexible packing, etc.), a folding carton, a rigid container (e.g., a plastic cup or tub, glass containers, metal cans, bottles such as PET bottles, jars, and tubes), envelopes, corrugate, a point-of-sale display, and the like. Particularly preferred printed articles are those having a dried form of the inkjet ink disposed on a complex three dimensional part of the printed article, for example, where the printed image is located on a fluted or corrugated portion of a plastic container, or on the concave dome-shaped bottom of a metal can.

The inkjet inks may be printed on porous (or penetrable) substrates, examples of which include, but are not limited to, non-coated paper, wood, membranes, corrugate (corrugated cardboard/fiberboard), and fabrics (including, for example, but not limited to, woven fabric, non-woven fabric, and foil-laminated fabric).

The inkjet inks may also be printed on non-porous (or non-penetrable substrates), for example, various plastics, glass, metals (e.g., steel, aluminum, etc.), and/or non-penetration papers (e.g., coated papers such as varnish coated papers), including, but not limited to, molded plastic or metal parts as well a flat sheets or rolls of plastic or metallic films. Examples include those substrates containing polyesters such as polyethylene terephthalate (PET) biaxially oriented polystyrene (OPS), polyolefins such as polyethylene (PE), polypropylene (PP), oriented polypropylene (OPP), and biaxially oriented polypropylene (BOPP), polylactic acid (PLA), nylon and oriented nylon, polyvinyl chloride (PVC), cellulose triacetate (TAC), polycarbonate, acrylonitrile butadiene styrene (ABS), polyacetal, polyvinyl alcohol (PVA), coated papers such as varnish coated papers, and metals such as steel and aluminum, and the like.

Method of Forming a Printed Image

With inkjet printing, a desired printed image is turned when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures for example about 35 μm×35 μm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other image patterns on the print medium. Since the nozzles are small, typically 10 μm to 40 μm in diameter, inks that minimize clogging are desired. In particular, since thermal inkjet (TIJ) is an open atmosphere print head design (the nozzle orifices are open to atmosphere and there is no valve seal at the orifice to allow ink pressurization), TIJ printing has historically suffered from poor performance during intermittent printing, where decap time (print idle time) causes premature drying of ink in and around the nozzles.

The present disclosure provides a method of forming a printed image by applying the inkjet ink, in one or more of its embodiments, onto a surface of a substrate by a thermal inkjet printhead and drying the inkjet ink. Use of the inkjet inks described herein overcomes the problem of short decap time (rate of solvent loss is too fast) commonly associated with thermal inkjet processes, while also enabling application of inkjet inks from greater throw distances than can be traditionally achieved with inkjet printing systems.

Any drop on demand printhead known to those of ordinary skill in the art of inkjet printing can be used as printing units in the present method, including continuous printheads, thermal printheads, electrostatic printheads, and acoustic printheads, preferably a thermal printhead (having a thermal transducer) is used. Typical parameters, such as, for example, printing resolution, printing speed, printhead pulse warming temperature, driving voltage and pulse length, can be adjusted according to the specifications of the printhead. Printheads which are generally suitable for usage in the methods herein have a droplet size in the range of 2 to 80 pL and a droplet frequency in the range of 10 to 100 kHz, and high quality prints may be obtained for example by setting the driving voltage to 8.0 to 9.5 Volts, the print speed up to 300 feet/minute, the pulse warming temperature to 25 to 45° C., and the pulse length to 0.7-2.5 microseconds, although values above or below these described may also be used and still obtain satisfactory prints. One non-limiting printhead example suitable for use in the disclosed methods is FUNAI TIJ cartridge made by Funai Co.

After application, the inkjet ink is dried. In some embodiments, external heat may be applied to dry the applied inkjet inks, for example, through the use of a heater. However, it is preferred that no external heat is applied to facilitate drying or to increase drying speeds. Therefore, in preferred embodiments, drying is achieved by allowing the applied inkjet ink to dry under ambient conditions (in air, at about 23° C.) for 30 seconds or less, preferably 25 seconds or less, more preferably 20 seconds or less, even more preferably 15 seconds or less, yet even more preferably 10 seconds or less, without the use of an external heat source such as a heater. Furthermore, the methods of the present disclosure do not require energy curing (e.g., UV or electron beam curing). Once the applied ink is deemed dry, further coatings of inkjet ink may be applied, or any processing steps known to those of ordinary skill in the art may be performed as desired.

It should also be recognized that substrate surface treatments such as corona treatment, atmospheric plasma treatment, and flame treatment may optionally be employed in the methods herein prior to application of the inkjet inks to improve printed article characteristics, for example ink adhesion. The parameters of such substrate surface treatments may be varied greatly depending on the substrate material to be printed, the specific inkjet ink utilized, the printing method applied, and the desired properties and applications of the printed article.

The examples below are intended to further illustrate the inkjet inks and are not intended to limit the scope of the claims.

EXAMPLES

Materials

EB Acetate is ethylene glycol mono-n-butyl ether acetate (b.p. 192° C.), available from Eastman. PICCOLYTE A25 is a terpene resin made from α-pinene (ring-and-ball SP=22-28° C.), available from Pinova. DERTOPHENE T160 is a terpene phenol resin (OHV=60 mgKOH/g; SP=160° C.; Mw=about 1,000 g/mol), available from DRT/Pinova. BYK-307 is polyether modified polydimethylsiloxane surfactant, available from BYK Additives & Instruments. OIL BLACK 860 is an organic dye, avoidable from Orient Chemical Industries.

Inkjet Ink Evaluation Methods

Printing Sample Preparation

The inkjet ink examples were evaluated through a FUNAI TIJ cartridge made by Funai Co. Thermal printing technology related to FUNAI was used to evaluate the inks (Software and hardware made by XiJet, Transport table made by Kirk Rudy).

Optical Density Evaluation

For evaluating optical density, the printing conditions utilized were as follows:

Printing substrate; The white area on Form 2C Opacity Chart, a black and white sealed opacity chart with overall dimensions of 7⅝×10¼ in (194×260 mm), available from Leneta. Company. Inc.
Printing resolution; 300 dpi*300 dpi (vertical*horizontal)
Pre Fire 500 nsec
Dead. Time 1700 nsec
Main Fire 1400 nsec
Voltage 9.0 V
Pulse warming OFF
Printing image; 100% duty (1 cm*10 cm, Monochrome bitmap, solid block image)

The solid block printing image was printed and the optical density of the image was measured using an X-rite eXact, Density/TVI mode spectrophotometer, sold by X-rite.

Decap Time Evaluation

Figure 2:
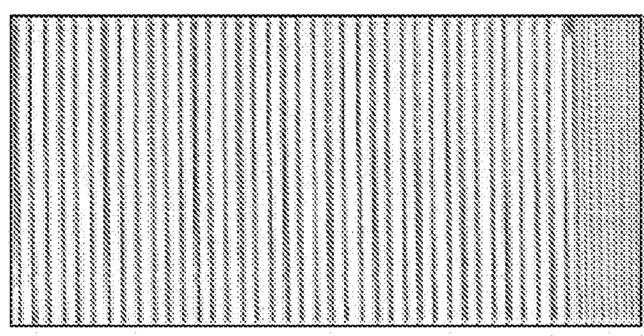
FIG. 2 illustrates the decap time evaluation for a "Good" rating (no lines missing/unclear in a narrow line image), "Acceptable" rating (1 or 2 lines missing/unclear in a narrow line image), and a "Not Good" rating (more than 2 lines missing/unclear in a narrow line image).
Figure 2:
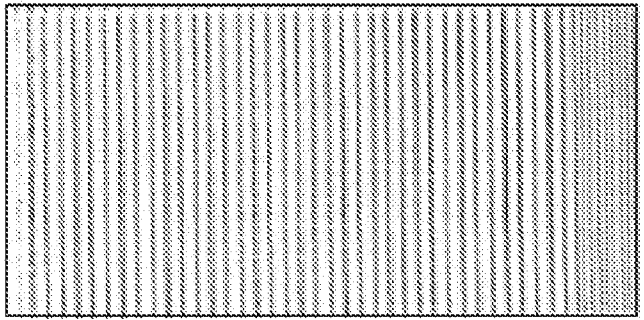
Figure 2:
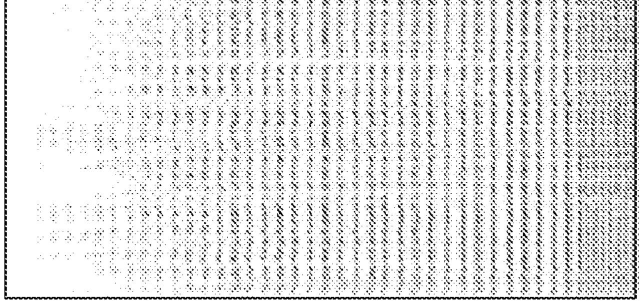

For evaluating decap times, the printing conditions utilized were as follows:

Printing substrate; normal (non-coated) paper
Printing resolution; 300 dpi*300 dpi (vertical*horizontal)
Pre Fire 500 nsec
Dead Time 1700 nsec
Main Fire 1400 nsec
Voltage 9.0 V
Pulse warming OFF
Printing image; 100% duty (1 mm*1 cm, Monochrome bitmap, narrow line image) (see e.g., FIG. 2)

The narrow line image was printed to confirm that there were no missing or unclear lines included in the printed image (signifying plugged or missing nozzles). After confirming, the printhead was left decapped for a specific time (30 seconds, 1 min, 10 min, or 60 min), then reprinted using the same narrow line image. The reprinted narrow line image (after the specific time lapse) was checked to determine whether loss of lines/loss of line clarity occurred. If no loss of lines/loss of line clarity occurred, then the inkjet inks were given a “Good” decap rating for that time interval. If 1-2 lines were lost/lost clarity at the tested time interval, but not enough to significantly affect the clarity or readability of the narrow line image at the tested time interval, then the inkjet inks were given an “Acceptable” decap rating for that time interval. If more than 2 lines were lost/lost clarity at the tested time interval, then the inkjet inks were classified as “Not Good” at that time interval. Suitable/desirable inkjet inks are those which achieve a, “Acceptable” or “Good” decap classification when decapped (i.e., exposed to air) for each of the tested time intervals.

Throw Distance Evaluation

For evaluating the throw distance, the printing conditions utilized were as follows:

Printing substrate; normal (non-coated) paper
Printing resolution; 300 dpi*300 dpi (vertical*horizontal)
Pre Fire 500 nsec
Dead Time 1700 nsec
Main Fire 1400 nsec
Voltage 9.0 V
Pulse warming OFF
Tested distance between printhead and substrate (throw distance); 2 mm, 4 mm, 6 mm, 8 mm, 10 mm
Printing image; 100% duty (see e.g., FIG. 1)
Alphanumeric sequence which reads:
Kao Collins Inc.
1201 Edison Drive,
Cincinnati, OH 45216

The alphanumeric sequence was printed onto the substrate at the various tested throw distances, and the resulting printed images were visually evaluated for image quality at the tested throw distance and rated according to Table 1. Suitable/desirable inkjet inks are those which achieve a “Good” or “Acceptable” throw distance evaluation for a throw distance of at least 8 mm.

TABLE 1

Throw distance evaluation

| Throw distance evaluation | Description | Image quality outcome |
|---|---|---|
| Good | Clear images; well-defined edges; accurate drop placement | Clearly readable |
| Acceptable | Images were mostly clear but with some haziness; slight loss of edge definition and drop placement accuracy | Readable |
| Not Good | Images lacked clarity; poor edge definition; inaccurate drop placement | Not readable |

Inkjet Ink Examples

Example inkjet inks are given in Table 2. The amount of each component is expressed in terms of weight percentage relative to a total weight (100%) of the inkjet ink.

* denotes the example is a comparative example.

Preparation Methods

To prepare the example inks, the resints) and any surfactant were first combined with the stated combination of methyl ethyl ketone (NIEK), dioxolane, and 1-propanol, and mixed by mechanical stirrer for at least 30 minutes. Then the EB Acetate was added into the mixture and mixed for at least 15 minutes. The dye was then added into the mixture and mixed for at least 30 minutes to obtain the inkjet inks. The inkjet ink examples were then evaluated through a FUNAI TIJ cartridge made by Funai Co.

TABLE 2

Inkjet Ink Examples 1-9

| Component | | Ex 1 | Ex 2 | Ex 3 | Ex 4 | Ex 5 | Ex 6* | Ex 7* | Ex 8 | Ex 9 |
|---|---|---|---|---|---|---|---|---|---|---|
| Methyl ethyl ketone | B1 | 4.00 | 24.00 | 44.00 | 64.00 | 79.00 | 84.90 | 4.00 | 4.00 | 4.00 |
| Dioxolane | B2 | 80.90 | 60.90 | 40.90 | 20.90 | 5.90 | — | 80.90 | 81.0 | 80.90 |
| 1-propanol | B4 | 1.00 | 1.00 | 1.00 | 1.00 | 1.00 | 1.00 | 1.00 | 1.00 | 1.00 |
| EB Acetate | B3 | 2.00 | 2.00 | 2.00 | 2.00 | 2.00 | 2.00 | 2.00 | 2.00 | 2.00 |
| PICCOLYTE A25 | A1 | 1.00 | 1.00 | 1.00 | 1.00 | 1.00 | 1.00 | — | 1.00 | 2.00 |
| DERTOPHENE T160 | A2 | 1.00 | 1.00 | 1.00 | 1.00 | 1.00 | 1.00 | 2.00 | 1.00 | — |
| BYK-307 | C | 0.10 | 0.10 | 0.10 | 0.10 | 0.10 | 0.10 | 0.10 | — | 0.10 |
| OIL BLACK 860 | D | 10.00 | 10.00 | 10.00 | 10.00 | 10.00 | 10.00 | 10.00 | 10.00 | 10.00 |
| Total | | 100.00 | 100.00 | 100.00 | 100.00 | 100.00 | 100.00 | 100.00 | 100.00 | 100.00 |

*denotes the example is a comparative example

Inkjet Ink Performance

From Table 3 it can be seen that the combination of methyl ethyl ketone, dioxolane, and terpene resin provided remarkable effects in terms of throw distance and decap times (Examples 1-5, 8, and 9). Conversely, inkjet inks formulated without dioxolane underperformed with respect to throw distances achieving readable images only at short throw distances of 2 to 4 mm and unacceptable image quality in the 6-10 mm range (Example 6).

In terms of the quantity of dioxolane, loadings in the range of 20.90-81.00 wt. % were found to provide long throw distances and excellent decap behavior (Examples 1-4, 8, and 9). Decreasing the amount of dioxolane to 5.90 wt. % maintained good decap behavior and led to slightly diminished throw distance capability (Example 5, 8 mm throw distance), though still far superior to inkjet inks lacking dioxolane.

It was also discovered that not all resins were compatible with the MEK/dioxolane solvent system, with those inkjet inks formulated with terpene phenol resin, but without terpene resin, suffering from poor decap behavior at each tested decap time interval (Example 7). Further, inks formulated without surfactant (Example 8) or without terpene phenol resin (Example 9) maintained desirable decap and throw distance performance.

TABLE 3

Evaluation of Inkjet Ink Examples 1-9

| | Ex 1 | Ex 2 | Ex 3 | Ex 4 | Ex 5 | Ex 6* | Ex 7* | Ex 8 | Ex 9 |
|---|---|---|---|---|---|---|---|---|---|
| Optical Density | 2.55 | 2.58 | 2.54 | 2.48 | 2.41 | 2.24 | 2.61 | 2.39 | 2.23 |
| Decap Time/ 30 sec | Good | Good | Good | Good | Good | Good | Not Good | Acceptable | Good |
| Decap Time/ 1 min | Good | Good | Good | Good | Good | Good | Not Good | Good | Good |
| Decap Time/ 10 min | Good | Good | Good | Good | Good | Good | Not Good | Good | Good |
| Decap Time/ 60 min | Good | Good | Good | Good | Good | Good | Not Good | Good | Good |
| Throw distance 2 mm | Good | Good | Good | Good | Good | Acceptable | Good | Good | Good |
| Throw distance 4 mm | Good | Good | Good | Good | Acceptable | Acceptable | Good | Good | Good |
| Throw distance 6 mm | Good | Good | Good | Acceptable | Acceptable | Not Good | Good | Acceptable | Good |
| Throw distance 8 mm | Acceptable | Acceptable | Acceptable | Acceptable | Acceptable | Not Good | Acceptable | Acceptable | Acceptable |
| Throw distance 10 mm | Acceptable | Acceptable | Acceptable | Acceptable | Not Good | Not Good | Acceptable | Acceptable | Acceptable |

Where a numerical limit or range is stated herein, the endpoints are included. Also, all values and subranges within a numerical limit or range are specifically included as if explicitly written out.

As used herein the words “a” and “an” and the like carry the meaning of “one or more.”

The present disclosure also contemplates other embodiments "comprising", "consisting of" and "consisting essentially of", the embodiments or elements presented herein, Whether explicitly set forth or not.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An inkjet ink, comprising:

(A1) a terpene resin that is a homopolymer made from α-pinene; and (B) a solvent system comprising (B1) a ketone solvent having a boiling point of less than 120° C. and (B2) dioxolane, wherein the terpene resin (A1) is present in an amount of 0.1 to 3 wt. %, based on a total weight of the inkjet ink;

the ketone solvent (B1) is present in an amount of 1 to 90 wt. %, based on a total weight of the inkjet ink;

the dioxolane (B2) is present in an amount of 2 to 90 wt. %, based on a total weight of the inkjet ink;

a combined weight of the ketone solvent (B1) and the dioxolane (B2) is at least 80 wt. %, based on a total weight of the solvent system (B); and a weight ratio of the dioxolane (B2) to the ketone solvent (B1)((B2):(B1)) is 0.05:1 to 30:1.

2. The inkjet ink of claim 1, wherein the ketone solvent (B1) is methyl ethyl ketone.

3. The inkjet ink of claim 1, wherein a weight ratio of dioxolane (B2) to the terpene resin (A1)((B2):(A1)) is 5:1 to 100:1.

4. The inkjet ink of claim 1, further comprising (D) a colorant.

5. The inkjet ink of claim 1, wherein the terpene resin (A1) is present in an amount of 0.6 to 2 wt. %, based on a total weight of the inkjet ink.

6. The inkjet ink of claim 1, wherein the solvent system (B) further comprises (B3) a glycol ether.

7. The inkjet ink of claim 6, wherein the glycol ether (B3) is present in an amount of 0.1 to 20 wt. %, based on a total weight of the inkjet ink.

8. The inkjet ink of claim 1, wherein the solvent system (B) further comprises (B4) an alcohol solvent.

9. The inkjet ink of claim 8, wherein the alcohol solvent (B4) is present in an amount of 0.1 to 20 wt. %, based on a total weight of the inkjet ink.

10. The inkjet ink of claim 1, further comprising (A2) a terpene phenol resin.

11. The inkjet ink of claim 10, wherein the terpene phenol resin (A2) is present in an amount of 0.1 to 10 wt. %, based on a total weight of the inkjet ink.

12. The inkjet ink of claim 1, further comprising (C) a surfactant.

13. The inkjet ink of claim 12, wherein the surfactant (C) is present in an amount of 0.001 to 4 wt. %, based on a total weight of the inkjet ink.

14. The inkjet ink of claim 12, wherein the surfactant (C) is a polyether modified silicone.

15. A printed article, comprising:

a substrate and a dried form of the inkjet ink of claim 1 disposed on the substrate.

16. A method of forming a printed image on a substrate, comprising:

applying the inkjet ink of claim 1 onto the substrate with a thermal inkjet printhead; and drying the inkjet ink.

* * * * *